(12) United States Patent
Walacavage et al.

(10) Patent No.: US 8,135,567 B2
(45) Date of Patent: Mar. 13, 2012

(54) METHOD OF EMULATING MACHINE TOOL BEHAVIOR FOR PROGRAMMABLE LOGIC CONTROLLER LOGICAL VERIFICATION SYSTEM

(75) Inventors: Joseph G. Walacavage, Ypsilanti, MI (US); Jim D. Coburn, Cleveland Heights, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 3387 days.

(21) Appl. No.: 09/966,121

(22) Filed: Sep. 28, 2001

(65) Prior Publication Data

US 2002/0040291 A1    Apr. 4, 2002

Related U.S. Application Data

(60) Provisional application No. 60/236,964, filed on Sep. 29, 2000.

(51) Int. Cl.
*G06G 7/48* (2006.01)
(52) U.S. Cl. ......... 703/7; 703/1; 703/6; 703/23; 700/32; 700/94; 700/97; 700/105
(58) Field of Classification Search ............... 703/25, 703/23, 8, 7, 1, 6; 700/30, 26, 17, 18, 32, 700/94, 97, 105
See application file for complete search history.

(56) References Cited

U.S. PATENT DOCUMENTS

| | | | |
|---|---|---|---|
| 4,928,221 A | 5/1990 | Belkhiter | |
| 4,998,206 A * | 3/1991 | Jones et al. | 700/96 |
| 5,050,088 A * | 9/1991 | Buckler et al. | 700/96 |
| 5,119,318 A | 6/1992 | Paradies et al. | |
| 5,249,135 A | 9/1993 | Fujita | |
| 5,377,116 A | 12/1994 | Wayne et al. | |
| 5,377,315 A | 12/1994 | Leggett | |
| 5,388,051 A | 2/1995 | Seki et al. | |
| 5,402,349 A | 3/1995 | Fujita et al. | |
| 5,574,637 A * | 11/1996 | Obata et al. | 700/2 |
| 5,644,493 A | 7/1997 | Motai et al. | |
| 5,691,711 A * | 11/1997 | Jorgensen | 340/5.67 |
| 5,758,123 A | 5/1998 | Sano et al. | |
| 5,796,618 A * | 8/1998 | Maeda et al. | 700/182 |
| 5,963,447 A | 10/1999 | Kohn et al. | |
| 5,991,533 A * | 11/1999 | Sano et al. | 703/28 |
| 6,167,406 A | 12/2000 | Hoskins et al. | |
| 6,185,469 B1 * | 2/2001 | Lewis et al. | 700/99 |

(Continued)

OTHER PUBLICATIONS

S. Kanai, T. Kishinami, A virtual Verification Environment for the Sequence Control System Using VRML and JAVA, 1999 by ASME, pp. 1-8.*

(Continued)

*Primary Examiner* — David Silver
*Assistant Examiner* — Kibrom Gebresilassie
(74) *Attorney, Agent, or Firm* — Bliss McGlynn, P.C.

(57) ABSTRACT

A method is provided of emulating and visualizing machine tool behavior for a programmable logic controller logical verification system for manufacturing a motor vehicle. The method includes the steps of constructing a mechanical model. The method also includes the steps of viewing motion of the mechanical model in a motion viewer and determining whether the motion of the mechanical model is acceptable. The method further includes the steps of replicating the motion previously defined with PLC code if the motion of the mechanical model was acceptable and using the accepted motion of the mechanical model to compare the behavior of the PLC code relative to the accepted motion.

19 Claims, 2 Drawing Sheets

U.S. PATENT DOCUMENTS

| | | |
|---|---|---|
| 6,223,134 B1 * | 4/2001 | Rust et al. ............... 702/121 |
| 6,263,487 B1 * | 7/2001 | Stripf et al. ............. 717/171 |
| 6,292,715 B1 | 9/2001 | Rongo |
| 6,308,113 B1 * | 10/2001 | Nowlin et al. ............ 700/245 |
| 6,442,441 B1 * | 8/2002 | Walacavage et al. ........ 700/86 |
| 6,470,301 B1 * | 10/2002 | Barral ..................... 703/1 |
| 6,526,373 B1 * | 2/2003 | Barral ..................... 703/6 |
| 6,618,856 B2 | 9/2003 | Coburn et al. |
| 6,847,922 B1 * | 1/2005 | Wampler, II ............... 703/1 |
| 6,928,337 B2 * | 8/2005 | Watanabe et al. .......... 700/245 |
| 7,308,327 B2 * | 12/2007 | Coburn et al. ............. 700/97 |
| 2002/0120921 A1 * | 8/2002 | Coburn et al. ............. 717/140 |
| 2002/0193972 A1 * | 12/2002 | Kudo et al. ............... 703/1 |
| 2003/0045947 A1 * | 3/2003 | Wampler .................. 700/32 |
| 2003/0074170 A1 * | 4/2003 | Watanabe et al. ........... 703/6 |

OTHER PUBLICATIONS

ThermaView Advanced Welder Diagnostics System, 1998.*

S. Kanai, T. Kishinami, A virtual Verification Environment for the Sequence Control System Using VRML and JAVA, 1999 by ASME, pp. 1-8.*

ThermaView Advanced Welder Diagnostics System, 1998.*

S. Vedapudi, "Using MCM to do Emulation of a Car Assembly Line" Brooks Automation Symposium '01, pp. 1-4.*

W. Dong, F. Palmquist, and S. Lidholm, "A Simple and Effective Emulation Tool Interface Development for Tricept Application" Proceedings of the 33rd ISR Oct. 7-11, 2002, 4 pages.*

Satoshi Kanai, and Takeshi Kishinami, herein referred as Kanai, "A Virtual Verification Environment for the Sequence Control System Using VRML and JAVA", 1999 by ASME, pp. 1-8.*

Matthew Rohrer, "Automod Product Suite Tutorial (Automod, Simulator, AutoSat) by Autosimulations" Proceeding of the 1999 Winter Simulation Conference, pp. 220-226.*

B. F. Boczkaj, Software Aspects of PLCs Application in Robotic Workcells, 1996 IEEE.*

W. Dai, M. Kampker, PIN—A PC-Based Robot Simulation and Offline Programming System Using Macro Programming Techniques, 1999 IEEE.*

P. Petruska, J. N. Marcincin, M. Doliak, ROANS—Intelligent Simulation and Programming System for Robots and Automated Workcell, 1997/.*

Beck et al., "Applying a Component-Based Software Architecture to Robotic Workcell Applications". IEEE Transactions on Robotics and Automation, vol. 16, No. 3, Jun. 2000.

Frey et al. "Formal Methods in PLC Programming", IEEE International Conference on Systems, Man and Cybernetics, Nashville, Tennessee, Oct. 2000.

Leduc, Ryan James, "PLC Implementation of DES Supervisor for a Manufacturing Testbed: An Implementation Perspective", Thesis submittal, Graduate Department of Computer and Electrical Engineering, University of Toronto, 1996, pp. i-xv, 50-51, 129-143, obtained via http://www.cas.mcmaster.ca/~leduc/rleduc-masc.pdf.

Lee Schruben, "Simulation Modeling with Event Graphs", 1983, ACM, Communications of the ACM, vol. 26, No. 11, pp. 957-963.

Tyler Phillips, "AutoMod™ by Autosimulations", 1998, Proceedings of the 1998 Winter Simulation Conference, pp. 213-218.

Diedra L. Donald, "A Tutorial on Ergonomic and Process Modeling Using Quest and IGRIP", 1998, Proceedings of the 1998 Winter Simulation Conference, pp. 297-302.

Jerry Banks, ed., "Handbook of Simulation", 1998 John Wiley & Sons, pp. 519-545.

Cynthia Erickson et al., "Simulation, Animation, and Shop-Floor Control", 1987, Proceedings of the 1987 Winter Simulation Conference, pp. 649-653.

Fernando Gonzalez, "A Simulation-Based Controller Builder for Flexible Manufacturing Systems",1996, Proceedings of the 1996 Winter Simulation Conference, pp. 1068-1075.

Fernando Gonzalez and Wayne Davis, "A Simulation-Based Controller for Distributed Discrete-Event Systems with Application to Flexible Manufacturing", 1997, Proceedings of the 1997 Winter Simulation Conference, pp. 845-852.

Jerry Banks, editor; Handbook of Simulation; 1998; John Wiley & Sons, Inc., pp. 3-51.

* cited by examiner

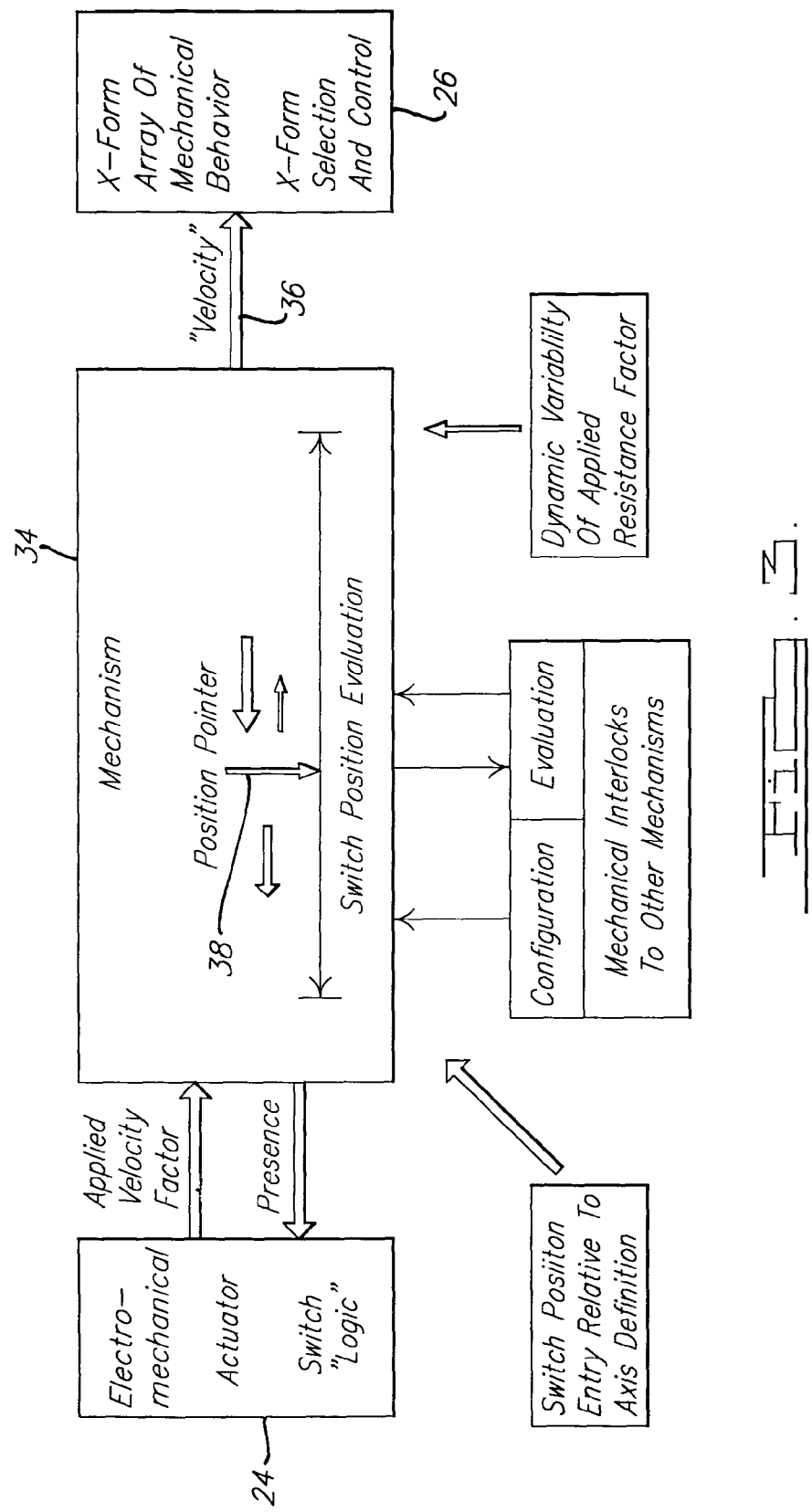

METHOD OF EMULATING MACHINE TOOL BEHAVIOR FOR PROGRAMMABLE LOGIC CONTROLLER LOGICAL VERIFICATION SYSTEM

CROSS-REFERENCE TO RELATED APPLICATION(S)

The present application claims the priority date of now abandoned U.S. Provisional Patent Application Ser. No. 60/236,964, filed Sep. 29, 2000.

BACKGROUND OF THE INVENTION

1. Field of the Invention

The present invention relates generally to programmable logic controllers and, more specifically, to a method of emulating machine tool behavior for a programmable logic controller logical verification system for manufacturing a motor vehicle.

2. Description of the Related Art

It is known that programmable logic controller code is written by controls engineers after assembly tooling designs are completed and a manufacturing process has been defined. The creation of the programmable logic controller code is mostly a manual programming task with any automation of the code generation limited to "cutting and pasting" previously written blocks of code that were applied to similar manufacturing tools. Once the programmable logic controller code is written, it is used by a programmable logic controller to operate subsequent hard tools used in the manufacture of parts for motor vehicles. The programmable logic controller code is not validated (debugged) until the hard tools are built and tried. A significant portion of this tool tryout process is associated with the debugging of the programmable logic controller code at levels of detail from a tool-by-tool level, to a workcell level and finally at a tooling or manufacturing line level.

It is also known that a manufacturing line is typically made of three to twenty linked workcells. Each workcell consists of a fixture to position product (sheet metal) and associated automation (robots) that process the product (welding). The workcell typically consists of a fixture/tool surrounded by three or four robots. The product is then transferred to the next workcell in the manufacturing line for further processing, until it exits the manufacturing line.

It is further known that the workcells for a manufacturing line can be modeled before the manufacturing line is implemented. The modeling techniques, such as Robcad from Tecnomatix and Igrip from Deneb, for the manufacturing process are limited in scope to a workcell level, due to how these type of technologies represent and manipulate three dimensional data and tool motions. This scope limitation is due to the manner in which tooling geometry is defined and the manner in which tool motions are described and displayed to a user. The geometry representation is defined through the use of (NURB) type equations, which are very exact and precise, but require intensive microprocessor calculations. The tooling and robotic motions are also microprocessor intensive in that the articulations and movements are described through the use of complex kinematic equations and solvers.

Debugging a PLC control program can broadly be grouped into two sets of conditions: one is verifying the correctness of machine logic as it applies to a workcell and local devices within the workcell; and secondly, verifying the logic of integrating the series of workcells into a manufacturing line, and especially "inter-workcell" devices like robots. Today, there is a need of using three-dimensional (3D) representations of a workcell linked to a PLC to demonstrate the correctness of the PLC logic. However, because these representations typically are full kinematic structures, the ability to scale up these representations to a full manufacturing line is severely limited by its impact on computer resources. In addition, there is no way of verifying the PLC code with the motion of a CAD model.

Therefore, it is desirable to provide a method of emulating machine tool behavior as part of a programmable logic controller logical verification system. It is also desirable to provide a method of emulating machine tool behavior with less than full kinematic structures as part of a programmable logic controller logical verification system. It is further desirable to provide a method of comparing the behavior of PLC code to accepted motion of a CAD model as part of a PLC logical verification system. Therefore, there is a need in the art to provide a method that meets these desires.

SUMMARY OF THE INVENTION

Accordingly, the present invention is a method of emulating machine tool behavior for a programmable logic controller logical verification system for manufacturing a motor vehicle. The method includes the steps of constructing a mechanical model. The method also includes the steps of viewing motion of the mechanical model and determining whether the motion of the mechanical model is acceptable. The method includes the steps of replicating the motion previously defined with PLC code if the motion of the mechanical model was acceptable. The method further includes the steps of using the accepted motion of the mechanical model to compare the behavior of the PLC code relative to the accepted motion.

One advantage of the present invention is that a method of emulating machine tool behavior for a programmable logic controller logical verification system is provided for use in building a tooling or manufacturing line to manufacture parts of a motor vehicle. Another advantage of the present invention is that a method is provided for allowing a controls engineer to compare the behavior of the PLC code to accepted motion of a CAD model as part of PLC logical verification system. Yet another advantage of the present invention is that the method uses transformational arrays that allows a different software technology to do the rendering; one that requires much less computer resource per unit of machine. Still another advantage of the present invention is that the method allows a controls engineer to examine the visual behavior of an entire manufacturing line, thereby verifying some of the more difficult controls problems such as inter-workcell behavior through observation of the visual operation of multiple concurrent workcells. A further advantage of the present invention is that the method allows a controls engineer to verify that the PLC control design system being planned will work as intended, prior to physically building the tools/manufacturing line. Yet a further advantage of the present invention is that the method allows the analytical verification of PLC code prior to vendor tool tryout (VTTO) and directly shortens product development timing, resulting in substantial timing and cost savings.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a diagrammatic view of a user interface for a mechanical model used in the method of FIG. 2.

DESCRIPTION OF THE PREFERRED EMBODIMENT(S)

Figure 1:
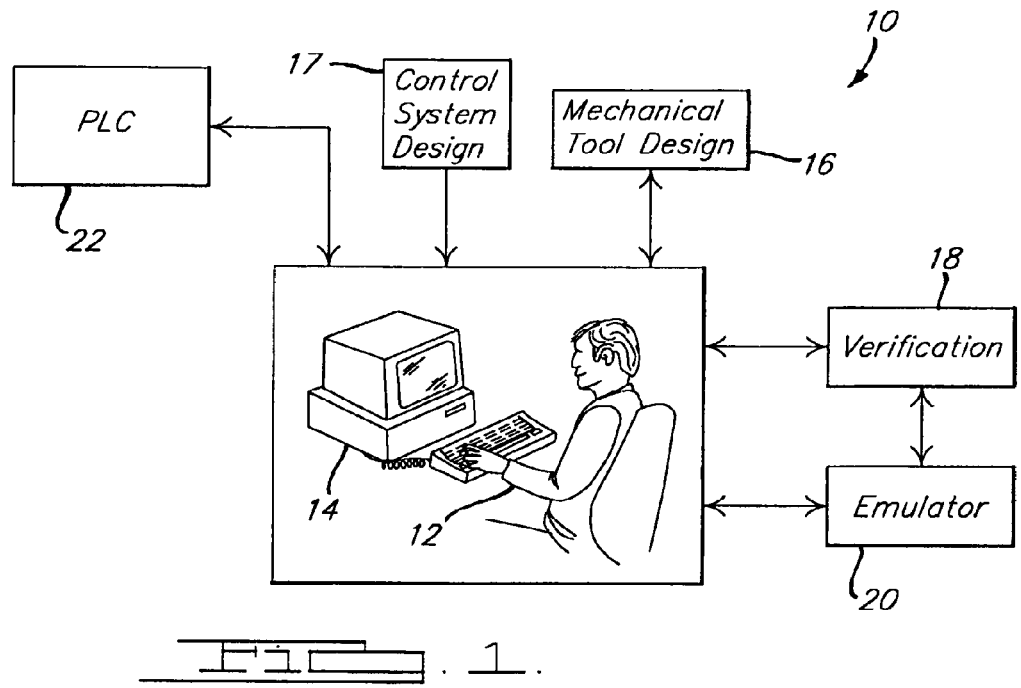
FIG. 1 is a diagrammatic view of a system, according to the present invention, for using a method of emulating machine tool behavior for a PLC logical verification system illustrated in operational relationship with an operator.

Referring to the drawings and in particular FIG. 1, one embodiment of a system 10, according to the present invention, of emulating machine tool behavior for a programmable logic controller (PLC) logical verification system is illustrated. In the present invention, a user 12 uses a computer 14 for carrying out the emulation. The computer 14 sends and receives information from a mechanical tool design system 16 via an electronic link. The mechanical tool design system 16 is a computer aided design (CAD) system and provides engineering data for standard components, tools, fixture models, and robots to create a mechanical model. The mechanical tool design system 16 allows the user 12 to define a set of kinematics or motions for the geometry of individual components in the mechanical model. The computer 14 sends and receives information from a control system design system 17 via an electronic link. The control system design system 17 creates the binding between a unit element such as a clamp in the mechanical model—the mechanism and the unit of control—and a control assembly. The control system design system 17 provides information for controls such as valves and switches. The control system design system 17 allows the user 12 to generate PLC code. The computer 14 sends and receives information with a PLC logical verification system 18 via an electronic link. The PLC logical verification system 18 allows the user 12 to create an electro-mechanical system model and verifies the PLC code for a workcell or a tooling or a manufacturing line. The computer 14 also sends and receives information with a "virtual PLC" emulator 20 via an electronic link. The emulator 20, with the mechanical tool design system 16, creates the binding between the unit element in the mechanical model, the mechanism, and the visualization of its behavior. The emulator 20 sends and receives information with the PLC logical verification system 18 to verify the PLC code. Once the PLC code is analytically verified, it is exported by the computer 14 via an electronic link to at least one PLC 22. The PLC 22 is then used at physical tool build to operate a workcell (not shown), which is used in a tooling or manufacturing line (not shown) for the manufacture of parts (not shown) for a motor vehicle (not shown). It should be appreciated that the computer 14, electronic links, and PLC 22 are conventional and known in the art.

Figure 2:
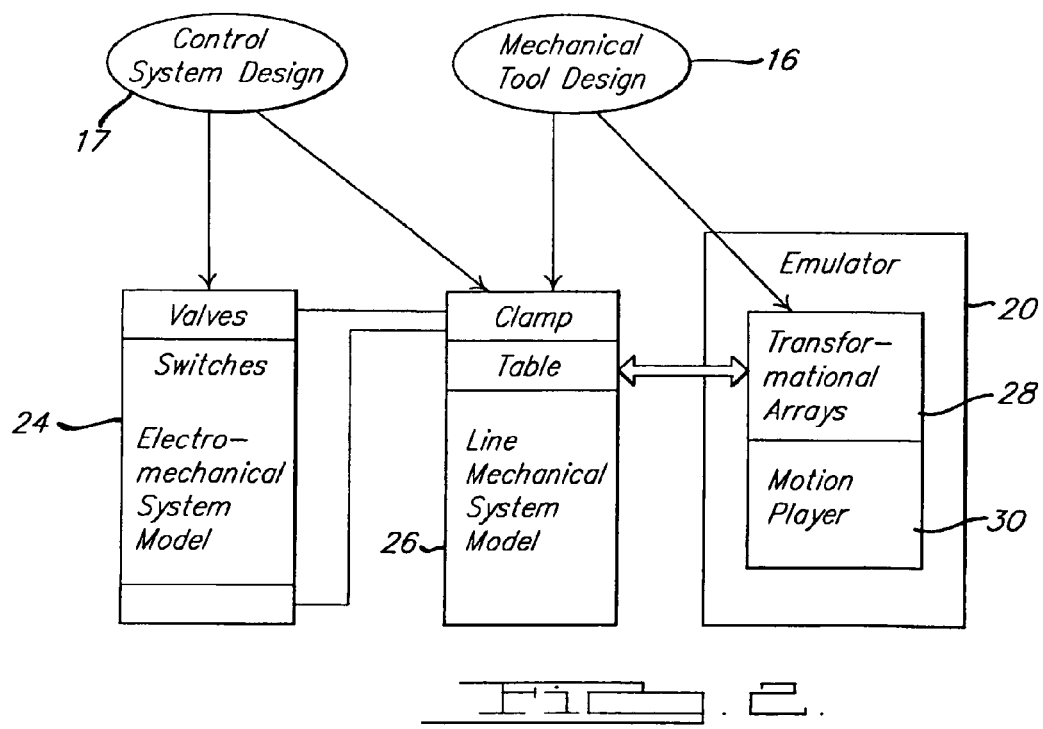
FIG. 2 is a diagrammatic view illustrating a method, according to the present invention, of emulating machine tool behavior as part of a PLC logical verification system for the system in FIG. 1.

Referring to FIG. 2, a method, according to the present invention, of emulating machine tool behavior as part of the PLC logical verification system 18 is shown. In general, the method includes generating transformational arrays based on CAD geometries during the design phase of the machinery for the mechanical model. The transformational arrays are movies of manipulation of individual components in the mechanical model and are generated with the mechanical tool design system 16. These transformational arrays are then associated with the particular piece of machine component, such as a clamp, throughout the life cycle of the design and verification process. It should be appreciated that the motion of the mechanical model can be generated without transformational arrays and could be generated with other similar technology.

Once the transformational arrays exist and the mechanical design is implemented on a CAD system to produce the mechanical model, the method includes exporting the mechanical model to a special purpose viewer or motion player 30 such as VisLine. Within the motion player 30, these transformational arrays are sequenced to give a first pass rendition of what the overall machine or manufacturing line behavior will be. After the user 12 is satisfied that the behavior is acceptable or the one desired, then all this information is exported to the controls system design system 17. The controls system design system 17 converts the sequence of the transformational arrays to PLC code. It should be appreciated that the machine components are bound to particular pieces of controls logic or the PLC code in such a way as to preserve the original intention of the first-pass representation. It should also be appreciated that the transformational arrays are bound to logical models of the machine components that are invoked through the virtual PLC technology.

The user 12, using the controls system design system 17, has now substituted the sequencing logic of the transformational arrays that was present in the first pass rendition with the PLC code that is intended to be executed on the plant floor. The user 12 exports the PLC code to the PLC emulator 20 to play and visualize the PLC code. By playing this PLC code in the PLC emulator 20, and through the binding that has been preserved through this process, the user 12 can observe the sequencing of these transformational arrays using the actual PLC code as if they were watching a machine or manufacturing line of a vehicle assembly plant floor. It should be appreciated that the method is carried out on the computer 14 by the user 12.

As illustrated in FIG. 2, the method includes using the PLC logical verification system 18 to construct an electro-mechanical model 24. The electro-mechanical model 24 is the collection of devices and their associated behavior that translates PLC I/O voltages into mechanical motion and provides appropriate feedback. The method includes exporting the electro-mechanical model 24 into a mechanical model 26.

The method also includes using the mechanical tool design system to construct a mechanical model 26. The mechanical model 26 is a portion of a simulated assembly or manufacturing line representing actual machines, as opposed to control hardware. The mechanical model 26 contains CAD geometries and mechanical motion from the electro-mechanical model. The geometry representation is defined through the use of (NURB) type equations.

The method includes generating transformational arrays 28 for the mechanical model 26 with the mechanical tool design system 16. The transformational arrays 28 are a set of coordinates in each of a plurality of arrays. The set of coordinates comprise six coordinates of three dimensions and three rotations. The transformational arrays 28 translate or transform the original coordinates for each point on the CAD geometry into a linear file of recorded coordinates. The transformational arrays are generated by incrementally recording one position of a specific piece of geometry as it is moved through space over a period of time. It should be appreciated that the user 12 of the CAD software for the mechanical tool design system 16 is the creator of the path of the mechanical element in the mechanical model.

The method includes constructing a motion file based on the mechanical model 26 and the transformational arrays 28 and viewing motion of the mechanical model 26 based on the transformational arrays 28 using a motion player 30 to play the motion file. A motion file is a series of transformations that represent the motion path of a three-dimensional object through simulation space. The motion player 30 interfaces with the mechanical model 26 to control when and in what direction a given motion file plays. The motion player 30 is a software product known as VisLine that provides a lightweight visual animation capability based on CAD three-dimensional models and sets of transformations called "motion files" derived from the CAD models. The order and time for the playing of a motion file is determined by executing a program written in the PLC emulator 20. The written program is a language specification supported by the PLC emulator 20, which is capable of communicating a complex sequence for the execution of motion files and is based on the execution of specified events according to specified conditions. It should be appreciated that events cause actions to occur and create signals available as conditions for executing other events. It should also be appreciated that the transformation does not change nature of object or part but moves the object or part in space.

The method further includes determining whether the motion of the mechanical model 26 is acceptable. The user 12 views the motion or behavior of the mechanical model 26 and determines whether the behavior is acceptable or desired. If the behavior is acceptable, the method exports all of this information to the controls system design system 17, which converts this information to PLC code to build a manufacturing line. The user 12 replicates the motion of the mechanical model 26 previously defined in the mechanical model 26 with motion commands in PLC code using the controls system design system 17. If the user 12 determines that the behavior is not acceptable or desired, the method includes returning to the mechanical tool design system 16 to change the mechanical model 26 as illustrated in FIG. 3.

After the sequencing logic of the transformational arrays has been replicated with PLC code, the user 12 exports the PLC code to the PLC emulator 20 to play and visualize the PLC code. The user 12 compares the behavior of the PLC code to the accepted motion of the mechanical model 26 through the sequencing of the transformational arrays 28 as if they were watching a machine or manufacturing line of a vehicle assembly plant floor. It should be appreciated that the method is carried out on the computer 14 by the user 12.

Referring to FIG. 3, a simulation user interface for the mechanical model 26 is shown that allows a manual override of current position to create a change of state in the mechanical model 26 that was not initiated by the control system design system 17. The interface includes a mechanism 34 to simulate a velocity 36 on the mechanical part or component in the mechanical model 26. The mechanism 34 has a position pointer 38 which may be moved to increase the capability from zero to one hundred. This position pointer 38 is then used to dynamically determine the appropriate position of the light duty geometry in the motion player 30. This is done by incrementally interpreting the position in the transformational array. It should be appreciated that each mechanical part requires certain persistent information in order to run motion files appropriately in order to accurately manipulate state of the mechanical model at rest. The position function file and the position of the verification system are synchronized by the verification system and putting a percentage on the signal to the motion player 30.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of using transformational arrays to emulate model behavior for a programmable logic controller logical verification system, said method comprising the steps of:
    constructing a mechanical model using a computer;
    generating transformational arrays for the mechanical model by incrementally recording one position of each piece of geometry of the mechanical model moved through space over a period of time using the computer;
    viewing motion of the mechanical model in a motion viewer based on the transformational arrays using the computer;
    determining whether the motion of the mechanical model is acceptable;
    replicating the motion of the mechanical model by generating a PLC code for the motion of the mechanical model using the computer if the motion of the mechanical model was acceptable; and
    using the accepted motion of the mechanical model to compare the behavior of the PLC code relative to the accepted motion by playing the PLC code with a PLC emulator.

2. A method as set forth in claim 1 wherein said step of constructing comprises using a mechanical tool design system to construct the mechanical model.

3. A method as set forth in claim 2 including the step of constructing an electromechanical model.

4. A method as set forth in claim 3 wherein said step of constructing the mechanical model includes binding the electromechanical model to the mechanical model.

5. A method as set forth in claim 4 wherein said step of constructing the electromechanical model comprises using a PLC logical verification system to construct the electromechanical model.

6. A method as set forth in claim 1 wherein said step of generating transformational arrays comprises generating the transformational arrays based on computer aided design (CAD) geometries of the mechanical model.

7. A method as set forth in claim 6 including the step of exporting the mechanical model to a control system design system.

8. A method as set forth in claim 7 including the step of constructing a motion file based on the mechanical model and transformational arrays.

9. A method as set forth in claim 8 wherein said step of displaying further comprises playing the motion file by a motion player.

10. A method as set forth in claim 8 including the step of returning to the mechanical tool design system if the motion of the mechanical model is not acceptable.

11. A method of using transformational arrays to emulate model behavior for a programmable logic controller logical verification system, said method comprising the steps of:
    constructing a mechanical model using a computer;
    generating CAD transformational arrays for motion in the mechanical model by incrementally recording one position of each piece of geometry of the mechanical model moved through space over a period of time using the computer;
    constructing a motion file based on the mechanical model and the CAD transformational arrays using the computer;

viewing the motion of the motion file in a motion viewer using the computer;
determining whether the motion of the mechanical model is acceptable;
replicating the motion of the mechanical model with motion commands in a PLC code using the computer if the motion of the mechanical model was acceptable; and
using the accepted motion of the mechanical model to compare the behavior of the PLC code to the accepted motion by playing the PLC code with a PLC emulator.

12. A method as set forth in claim 11 wherein said step of constructing comprises using a mechanical tool design system to construct the mechanical model.

13. A method as set forth in claim 12 including the step of constructing an electromechanical model.

14. A method as set forth in claim 13 wherein said step of constructing the mechanical model includes binding the electromechanical model to the mechanical model.

15. A method as set forth in claim 14 wherein said step of constructing the electromechanical model comprises using a control system design system to construct the electromechanical model.

16. A method as set forth in claim 11 wherein said step of generating comprises generating CAD transformational arrays based on computer aided design (CAD) geometries of the mechanical model.

17. A method as set forth in claim 11 including the step of exporting the mechanical model to the PLC emulator.

18. A method as set forth in claim 11 wherein said step of displaying further comprises playing the motion file by a motion player.

19. A method as set forth in claim 11 including the step of returning to the mechanical tool design system if the motion of the mechanical model is not acceptable.

* * * * *